United States Patent [19]

Koike et al.

[11] Patent Number: 5,746,841

[45] Date of Patent: May 5, 1998

[54] PROCESS FOR PASSIVATING TREATMENT OF PIPING SYSTEM FOR HIGH-PURITY GAS

[75] Inventors: Kunihiko Koike; Goichi Inoue, both of Moriyama, Japan

[73] Assignee: Iwatani Sangyo Kabushiki Kaisha (Iwatani International Corporation), Osaka, Japan

[21] Appl. No.: 612,644

[22] Filed: Mar. 8, 1996

[30] Foreign Application Priority Data

Jan. 17, 1996 [JP] Japan ................... 8-005327

[51] Int. Cl.$^6$ ................................. C23C 8/12
[52] U.S. Cl. ........................ 148/280; 148/286
[58] Field of Search ................. 148/280, 286; 427/237, 248.1, 255.3, 255.4

[56] References Cited

U.S. PATENT DOCUMENTS 5,224,998  7/1993  Ohmi et al. ................ 118/720
5,226,968  7/1993  Ohmi et al. ................ 118/720

FOREIGN PATENT DOCUMENTS

| 0024463 | 6/1986 | Japan . |
| 2-43353 | 2/1990 | Japan . |
| 5-287496 | 11/1993 | Japan . |
| 6-116632 | 4/1994 | Japan . |
| 6235058 | 8/1994 | Japan . |

*Primary Examiner*—Shrive Beck
*Assistant Examiner*—Timothy Meeks
*Attorney, Agent, or Firm*—Lowe, Price, LeBlanc & Becker

[57] ABSTRACT

A high-concentration ozone gas having a concentration of at least 50 VOL % of ozone in the ozone-oxygen system is acted within the temperature range of a normal temperature to 60° C. on an ultrapurity-gas piping system for use in a semiconductor manufacturing apparatus and the like or on a metal component part for use in an ultrahigh-vacuum apparatus to form a passivation film on the interior metal surface thereof.

4 Claims, 9 Drawing Sheets

PROCESS FOR PASSIVATING TREATMENT OF PIPING SYSTEM FOR HIGH-PURITY GAS

BACKGROUND OF THE INVENTION

1. Field of the Invention

The present invention relates to a process for passivating treatment of a piping system such as an ultrahigh-purity gas piping passage for use in a semiconductor manufacturing apparatus and the like and metal component parts or the like for use in an ultrahigh-vacuum apparatus.

2. Disclosure of Prior Art

Recently, the technology for realizing an ultrahigh-vacuum and the technology for obtaining an ultrahigh-purity decompressed atmosphere by flowing a small amount of a certain gas into a vacuum chamber have become very important. These technologies are widely applied to the study of material characteristics, the formation of various kinds of thin film, the manufacturing of semiconductor devices and so on. As a result, though a higher degree of vacuum has been accomplished, it is also keenly required to realize the decompressed atmosphere wherein the contamination of impurity elements and impurity molecules is reduced to the utmost.

For example, when exemplifying the semiconductor device, unit elements have been reduced in size from year to year to promote an integration density of an integrated circuit, so that vigorous studies and developments have been made in order to put into practical use such semiconductor devices as to have 1 µm to submicron sizes, especially sizes of not higher than 0.5µ. In the manufacturing of such semiconductor devices, a process for forming thin films and a process for etching the thin films in predetermined circuit patterns are repeated. Generally, such processes are carried out under an ultrahigh-vaccum condition or in a decompressed atmosphere into which a predetermined gas has been introduced, after placing silicon wafers within a vacuum chamber. If impurities enter the chamber during those processes, there appears, for example, such a problem that thin film quality is degraded or that satisfactory accuracy can't be attained in microtreatment. This is the reason why the decompressed atmosphere of an ultrahigh-vacuum and ultrahigh-purity is needed.

Mentioned as one of the serious causes which have hindered the realization of the ultrahigh-vacuum and ultrahigh-purity decompressed atmosphere up to now is a gas oozing from surfaces of stainless steels which are widely used for a chamber, a gas piping and so on. Therefore, in order to prevent the gas oozing, conventionally there has been proposed as a surface treatment technique of the stainless steel, mainly so-called a wet treatment in which a thin film (passivation film) is formed on the surface by dipping a material to be treated, which material has undergone an electrolytic polishing, into a heated nitric acid solution. In this case, however, much moisture or much solution constituent remains on the surface of the film and/or within the film or in a boundary area between the stainless steel and the film, so that these remaining moisture and solution constituent, especially the moisture adsorbed in the surface separates off into the vacuum or the decompressed atmosphere. Thus, this separated moisture has become the most serious contamination source.

Therefore, recently there has been proposed a dry treatment technique in which an oxide film forming gas is brought into contact with the surface of a material to be treated so as to form a chrome oxide film thereon for the passivation of the surface. As for this conventional dry treatment technique, there have been proposed a one (disclosed in Japanese Patent Laid Open Publication No. Hei 2-43353) in which a material to be treated (for example, a stainless steel pipe) is heated up nearly to an oxidization temperature (400°–550° C.) and then subjected to the action of an oxygen gas heated up to the oxidizing treatment temperature to form the chrome oxide film on the surface of the material for the passivation of the surface; a one (disclosed in Japanese Patent Laid Open Publication No. Hei 6-116632) in which a stainless material is treated within an argon atmosphere formed by mixing 10% of hydrogen and 1% of moisture, at about 500° C. for 1 hour to form the chrome oxide film on the surface thereof; and a one (disclosed in Japanese Patent Laid Open Publication No. Hei 5-287496) in which the stainless material is treated within an oxygen atmosphere containing 5–10% of ozone gas, at 200° C. for about 3 hours.

3. Problems Presented by the Prior Art

In all of the conventional dry treatment techniques for forming the chrome oxide film on the surface of the stainless material, since the oxide film is formed within the heated atmosphere, a high temperature heating furnace is needed, so that there appears a problem that a size of the stainless material is limited to a certain extent by the dimensional relation with the heating furnace. Further, since the oxide film forming gas is made to contact with the material to be treated under a heated condition, there appears also another problem that the concentration of the oxide film forming gas differs on the upstream side and on the downstream side in the gas flowing direction due to the consuming of gas constituent caused while it is flowing to invite unevenness in the thickness of the oxide film.

Moreover, in a practical piping system, a plurality of pipes and fittings are arranged so as to connect a high-purity gas supply source with a high-purity gas utilizing apparatus and their connections should be welded. Therefore, when welding the pipes and fittings having the interior surfaces previously formed with the chrome oxide films, there appears a problem that metal compositions in the welded portions are changed by that welding working to result in failing to coat the welded portions with the chrome oxide films.

SUMMARY OF THE INVENTION

The present invention is directed to solving those problems and for its object to provide a technique which is capable of reliably forming a chrome oxide film on a gas contact interior surface of a piping passage at a normal temperature, not only for the pipes in single state and the component parts to be fitted to a pipe line but also after the completion of the piping.

For accomplishing the above-mentioned object, a first invention is characterized in that an oxide passivation film is formed on a metal surface by acting a high-concentration ozone gas containing at least 50 VOL % of ozone in the ozone-oxygen system on an electrolytically polished metal surface or an electrolytically combination-polished metal surface (i.e., subjected to a simultaneous polishing by means of a polishing material and an electrolyte through inserting the polishing material into the electrolyte and rotating the electrodes) at a normal temperature.

For accomplishing the above-mentioned object, a second invention is characterized in that a high-purity gas supply source and a high-purity gas utilizing apparatus are connected to each other by a piping passage, and then an interior gas contact surface of the piping passage for the high-purity gas is passivated by hermetically charging the high-concentration ozone gas into the piping passage.

In the first invention, by using the high-concentration ozone gas containing at least 50 VOL % of ozone in the ozone-oxygen system, it becomes possible to form the passivation film at a normal temperature.

In the second invention, since the gas contact surface of the piping system is passivated by entirely piping a high-purity gas supply passage for connecting the high-purity gas supply source with the high-purity gas utilizing apparatus and then hermetically charging the high-concentration ozone gas into the piping, it becomes possible to passivate the welded portions as well. Thereby, since the piping surface superior in the degasifying characteristic and the drying characteristic can be obtained, the high-purity gas flowing through the piping passage can be supplied into the high-purity gas utilizing apparatus without being contaminated.

Since the oxide film formed by the passivating treatment of the present invention is mainly composed of the chrome oxide, the film is superior in corrosion resistance, so that it becomes possible to prevent corrosion degradation of the piping passage which might be caused by a highly corrosive gas. Further, since a catalytic action of the piping passage surface can be restrained or reduced by the passivating treatment to restrain the autolysis of high-reactive gas, it becomes possible to feed the supply gas into the high-purity gas utilizing apparatus without degrading the quality of the supply gas.

Moreover, in the second invention, since the passivating treatment is applied throughout the piping passage by hermetically charging the high-concentration gas into the piping passage after the completion of the piping arrangement, an apparatus for the passivating treatment can be simplified as well as a satisfactory passivation film can be formed even when the inexpensive electrolytically polished pipes are used for the piping, so that it becomes possible to inexpensively construct the high-purity gas supply piping system.

Further, since the high-concentration ozone gas is hermetically charged into the piping system, the concentration of the gas charged into the piping passage can be maintained uniformly in its entirety, differently from the gas flowing treatment, so that the unevenness in the oxide film thickness can be excluded.

DESCRIPTION OF THE DRAWINGS

FIG. 4(a) shows the profiles of the element compositions thereof in the depth direction from the surface, and FIG. 4(b) is a diagram showing a change of the ozone concentration during the treatment;

FIG. 5(a) shows the profiles of the element compositions thereof in the depth direction from the surface, and FIG. 5(b) is a diagram showing a change of the ozone concentration during the treatment;

FIG. 6(a) shows the profiles of the element compositions thereof in the depth direction from the surface, and FIG. 6(b) is a diagram showing a change of the ozone concentration during the treatment;

FIG. 7(a) shows the profiles of the element compositions thereof in the depth direction from the surface, and FIG. 7(b) is a diagram showing a change of the ozone concentration during the treatment;

FIG. 8(a) shows the profiles of the element compositions thereof in the depth direction from the surface, and FIG. 8(b) is a diagram showing a change of the ozone concentration during the treatment;

FIG. 9(a) shows the profiles of the element compositions thereof in the depth direction from the surface, and FIG. 9(b) is a diagram showing a change of the ozone concentration during the treatment;

DESCRIPTION OF THE PREFERRED EMBODIMENTS

Figure 1:
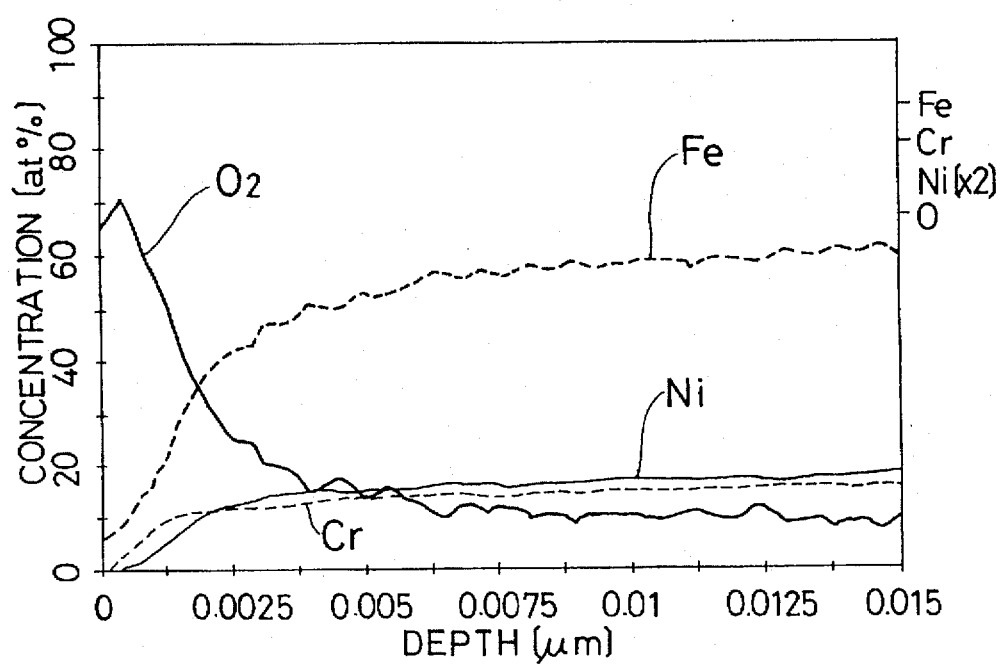
FIG. 1 shows profiles of element compositions of the untreated electrolytically polished SUS316L pipe in the depth direction from the surface.

An experimental apparatus for a semiconductor manufacturing apparatus comprises a chamber and a piping passage both of which are formed from stainless steel (SUS 316L) having an interior surface subjected to the electrolytic polishing and the mirror finishing. After the experimental apparatus for the semiconductor manufacturing apparatus has undergone the vacuum evacuation under an air-tightly sealed condition, an ozone gas having a purity of 100 VOL % is hermetically charged into the experimental apparatus at a room temperature (23° C.) at a gage pressure of 0.63 Kg/cm$^2$ and left for 48 hours under that condition.

After the elapse of that leaving time, the ozone gas within the experimental apparatus is discharged and then the formation of a passivation film on the interior surface of the experimental apparatus is confirmed by analyzing and investigating the distribution of element compositions and the oxidization thereof in the depth direction from the surface by using the X-ray photoelectronic spectroscopic analysis method.

When the same treatment as the above-mentioned one is applied thereto by using an ozone gas having a concentration of 50 VOL % of ozone in the ozone-oxygen system, the formation of a passivation film can be also confirmed. Incidentally, when the similar treatments are applied thereto by using ozone gases having the respective concentrations of 5 VOL % and 45 VOL % of ozone in the ozone-oxygen system, the formations of passivation films are not satisfactory at a normal temperature.

In a practical semiconductor manufacturing process, a high-purity gas supply passage is constructed by connecting a storage container, which stores the high-purity gas to be used, with a high-purity gas utilizing apparatus for a semiconductor manufacturing apparatus and so on through electroytically polished stainless steel gas supply pipes and fittings having the same grade thereof for communication. This high-purity gas supply passage has a plurality of gas supply pipes connected to one another by means of welding or the like and various kinds of devices such as a flow regulating valve and a pressure regulating valve arranged therein. After the completion of entire piping connections, blank flanges are interposed or valves are arranged at the connection to the high-purity gas storage container and at the connection to the high-purity gas utilizing apparatus respectively so that the high-concentration ozone gas having the concentration of at least 50 VOL % of ozone in the ozone-oxygen system is hermetically charged into the high-purity gas supply passage located between both those blank flanges or between both those valves to passivate the interior surface of the gas supply passage, the interior surface portions at the welded connections between both the gas supply passages and/or the interior surfaces (the gas contact surfaces) of the devices. After that, the valves are opened or both the blank flanges are removed to connect the gas supply pipes with the high-purity gas storage container and the high-purity gas utilizing apparatus.

The supply/discharge of the high-concentration ozone gas for the passivation treatment employing the ozone gas after that piping arrangement is carried out by using any one of various kinds of ports such as a pressure gage mounting port and a gas analyzer mounting port arranged in the high-purity gas supply pipe. That is, the vacuum evacuation is applied to the gas supply piping passage after that piping arrangement, then the high-concentration ozone gas is supplied into the passage and left for a predetermined time, and subsequently the ozone gas is discharged by suction. According to the requirement, further supplying of a new high-concentration ozone gas and the discharging thereof after the leaving for the predetermined time are repeated several times to passivate the interior of the piping passage.

When this passivation treatment employing the high-concentration ozone gas is carried out at a high temperature exceeding 60° C., since the autolysis reaction to be caused by a temperature of the ozone gas itself is promoted, it is preferable to carry out the supply/leaving at a normal temperature (a room temperature) or within a temperature range not higher than 60° C. Thus, the high-concentration ozone gas to be discharged during the passivation treatment is decomposed by passing it through a known ozone decomposing apparatus and then released to the atmosphere.

Incidentally, the high-concentration ozone gas to be used for this passivation treatment means such an ozone gas as to have a concentration of at least 50 VOL % of ozone in the ozone-oxygen system. When using a gas produced through the concentrating by means of adsorbent or the gasification of liquefied ozone, it becomes possible to attain an ozone concentration near to 100 VOL %.

Thicknesses of the oxide films to be formed on the surface of the electrolytically polished SUS 316L pipe by changing the temperature condition, the ozone concentration in the ozone-oxygen system and the treatment time were measured.

FIG. 1 shows profiles of element compositions in the depth direction from the surface of a untreated electrolytically polished SUS 316L pipe, and it can be understood from these profiles that a natural oxide film of about 10 Å has been formed even on the untreated surface.

Figure 2:
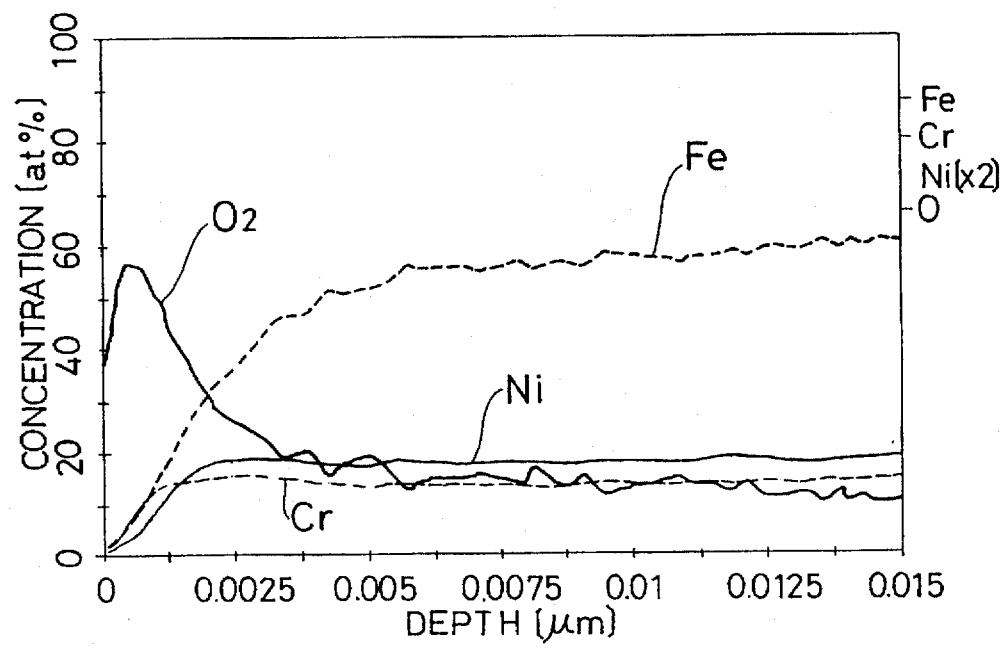
FIG. 2 shows the profiles of the element compositions thereof in the depth direction from the surface when treated by employing pure oxygen at 40° C. for 40 hours.
Figure 3:
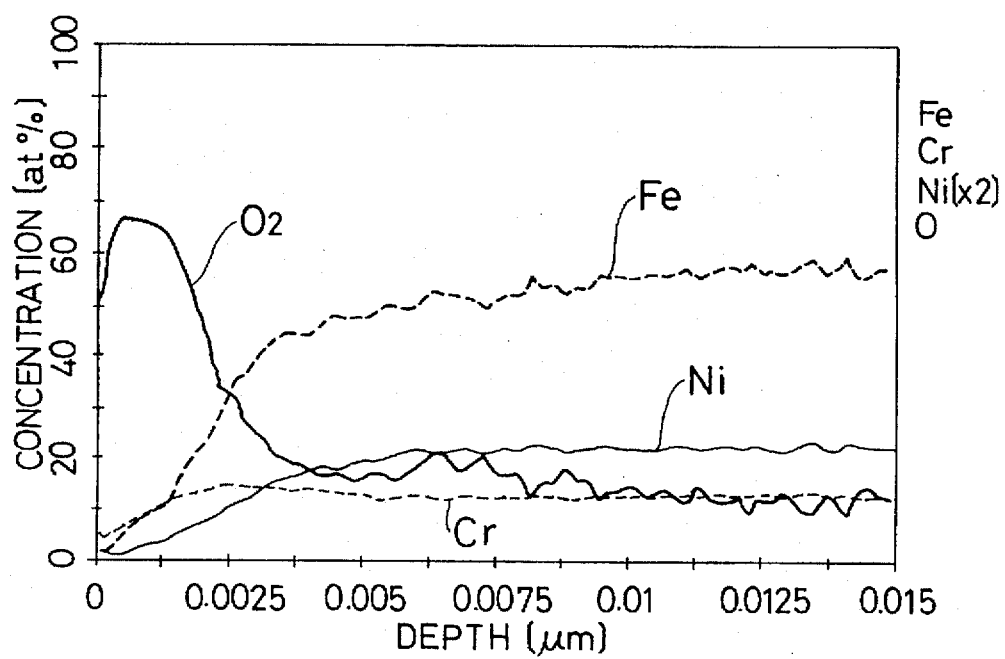
FIG. 3 shows the profiles of the element compositions thereof in the depth direction from the surface when treated by employing an ozone gas having a concentration of 5 VOL % of ozone in the ozone-oxygen system at 40° C. for 40 hours.

Even when the pure oxygen is hermetically charged into that electrolytically polished pipe and the pipe is exposed thereto at 40° C. for 40 hours for treatment, as shown in FIG. 2, the film doesn't become thicker than the natural oxide film. When the ozone gas having the concentration of 5 VOL % of ozone in the ozone-oxygen system is hermetically charged into the electrolytically polished pipe and the pipe is exposed thereto at 40° C. for 40 hours, as shown in FIG. 3, the formation of an oxide film having the thickness of about 25 Å can be recognized. But, this degree of thickness is not enough for the thickness of the passivation film.

Next, profiles of element compositions in the depth direction from the surface in the case where the electrolytically polished pipe has been treated by the ozone gas of 100 VOL % of ozone obtained by the gasification of liquefied ozone are shown in FIGS. 4 to 9.

Figure 4A:
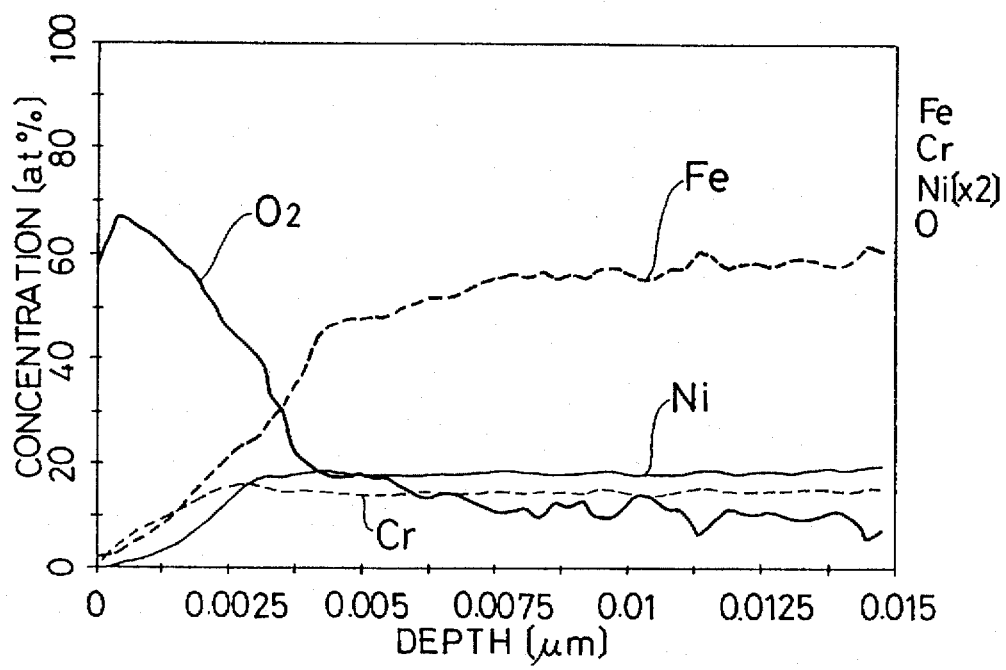
FIGS. 4(a) and 4(b) show the case of the treatment by an ozone gas of 100 VOL % of ozone, at 20° C. for 20 hours.
Figure 4B:
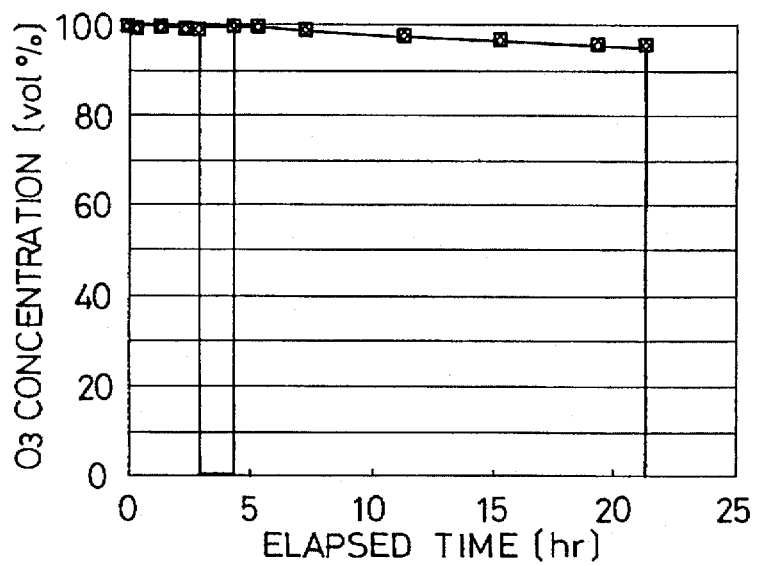

FIG. 4(a) shows the profiles in the case of the treatment at 20° C. for 20 hours, and FIG. 4(b) shows a change of the ozone concentration caused by the autolysis for that same treatment time, respectively. In this case it can be confirmed that an oxide film of about 30 Å has been formed.

Figure 5A:
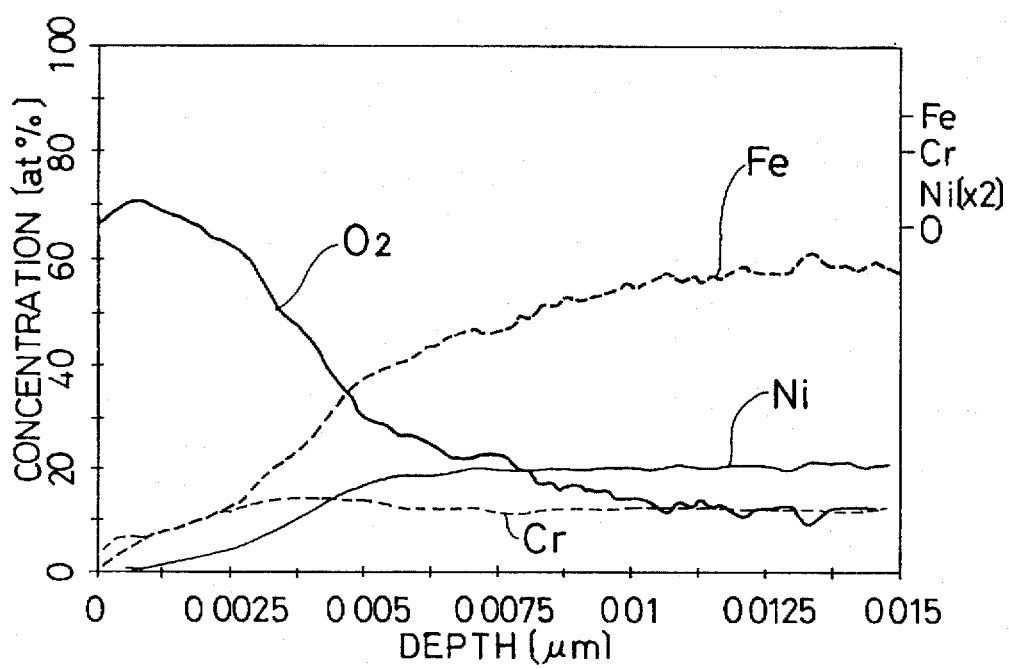
FIGS. 5(a) and 5(b) show the case of the treatment by the ozone gas of 100 VOL % of ozone, at 20° C. for 40 hours.
Figure 5B:
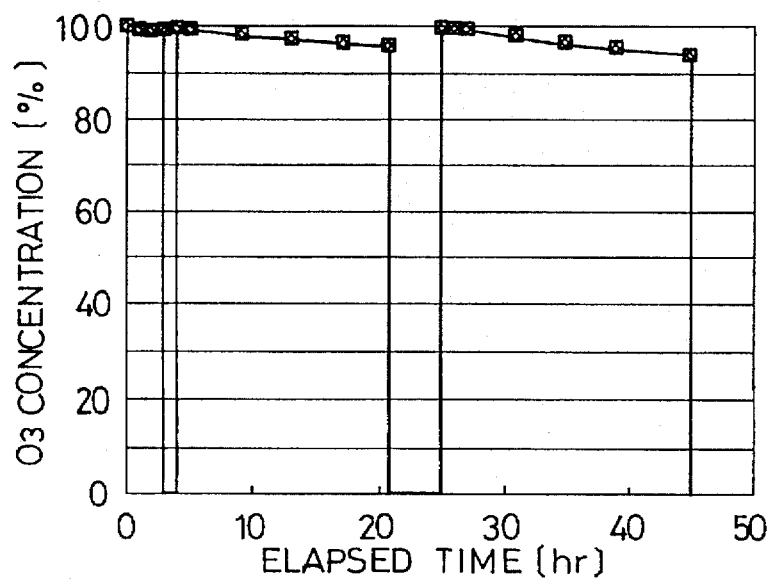

FIG. 5(a) shows the profiles in the case of the treatment at 20° C. for 40 hours, and FIG. 5(b) shows a change of the ozone concentration caused by the autolysis for that same treatment time, respectively. In this case it can be confirmed that an oxide film of about 40 to 50 Å has been formed.

Figure 6A:
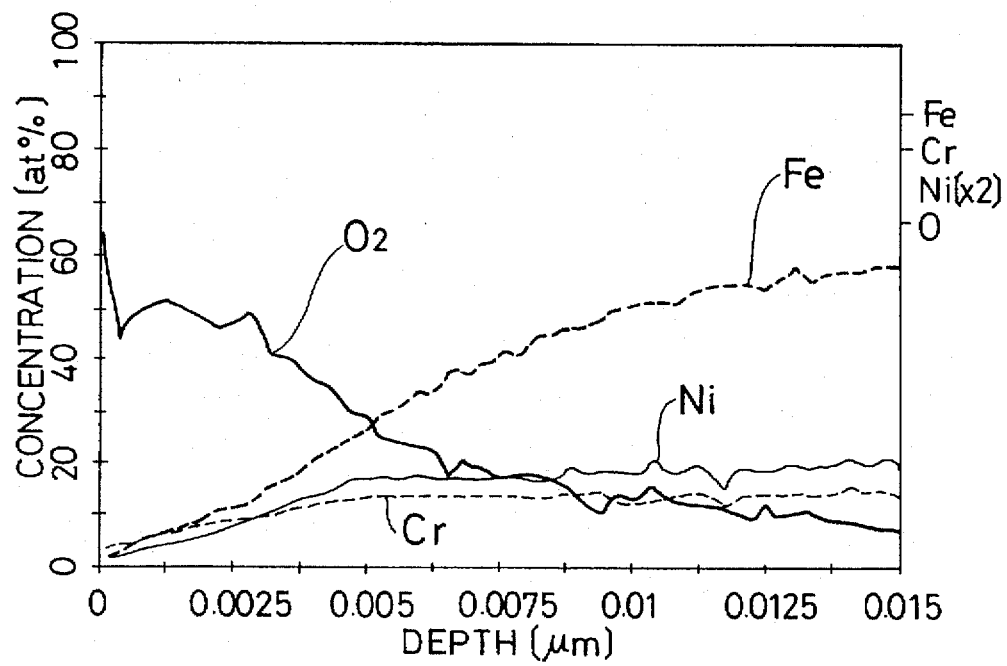
FIGS. 6(a) and 6(b) show the case of the treatment by the ozone gas of 100 VOL % of ozone, at 40° C. for 20 hours.
Figure 6B:
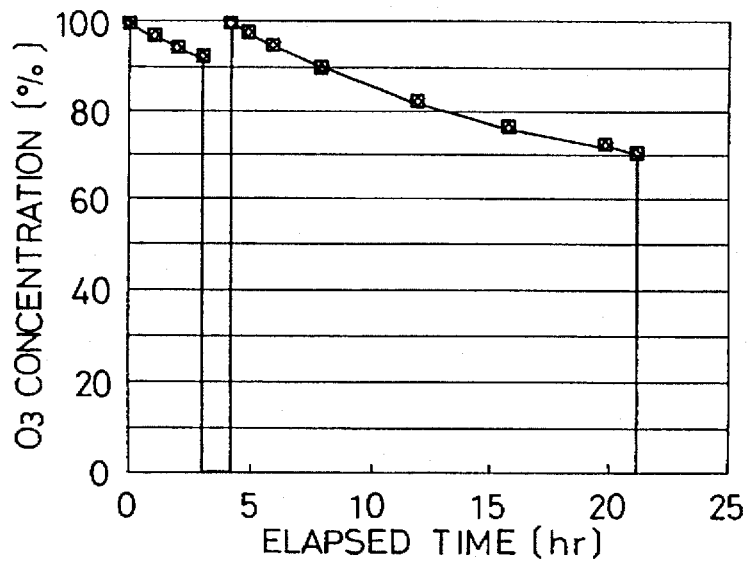

FIG. 6(a) shows the profiles in the case of the treatment at 40° C. for 20 hours, and FIG. 6(b) shows a change of the ozone concentration caused by the autolysis for that same treatment time, respectively. In this case it can be confirmed that an oxide film of about 40 to 50 Å has been formed.

Figure 7A:
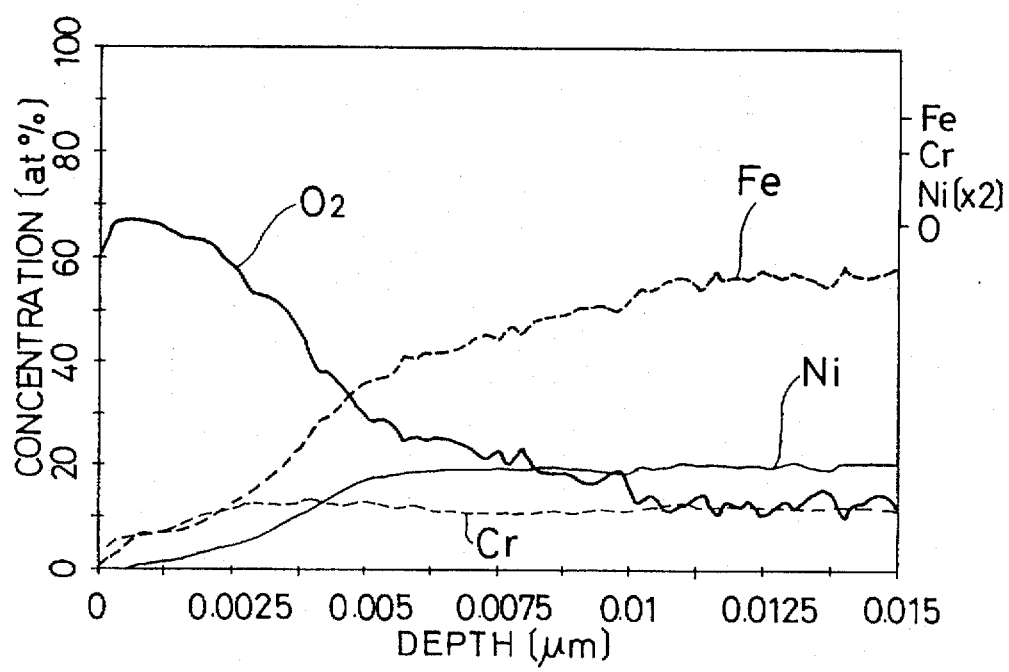
FIGS. 7(a) and 7(b) show the case of the treatment by the ozone gas of 100 VOL % of ozone, at 40° C. for 40 hours.
Figure 7B:
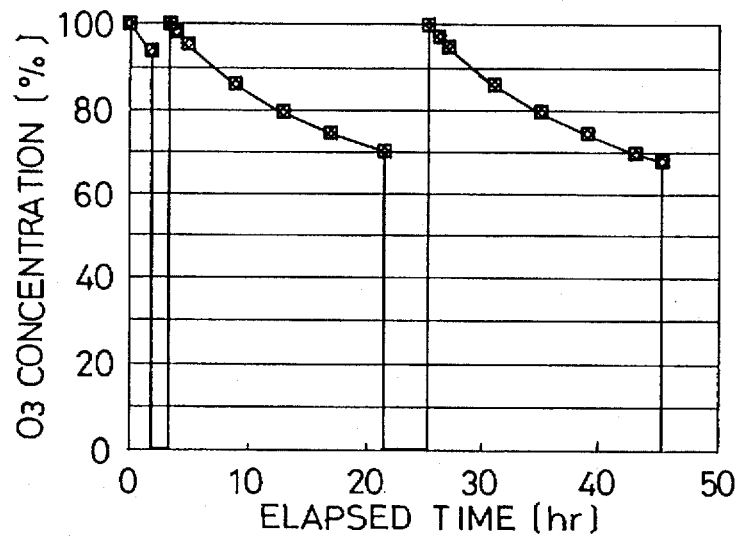

FIG. 7(a) shows the profiles in the case of the treatment at 40° C. for 40 hours, and FIG. 7(b) shows a change of the ozone concentration caused by the autolysis for that same treatment time, respectively. In this case it can be confirmed that an oxide film of about 40 to 50 Å has been formed.

Figure 8A:
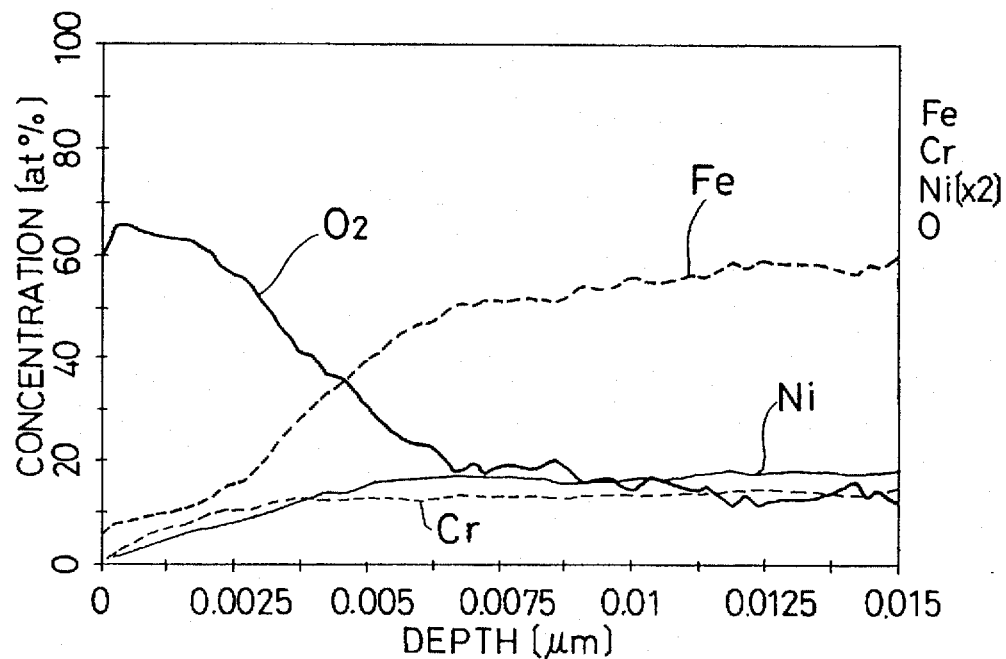
FIGS. 8(a) and 8(b) show the case of the treatment by the ozone gas of 100 VOL % of ozone, at 60° C. for 20 hours.
Figure 8B:
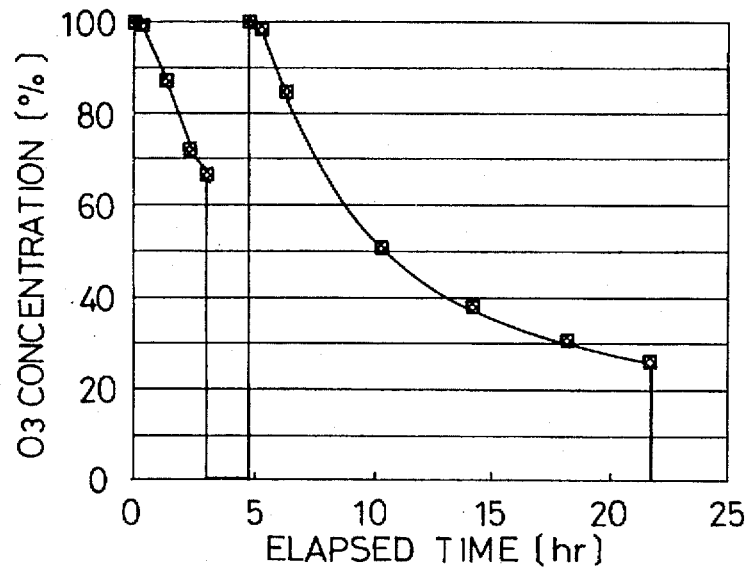

FIG. 8(a) shows the profiles in the case of the treatment at 60° C. for 20 hours, and FIG. 8(b) shows a change of the ozone concentration caused by the autolysis for that same treatment time, respectively. In this case it can be confirmed that an oxide film of about 45 to 55 Å has been formed.

Figure 9A:
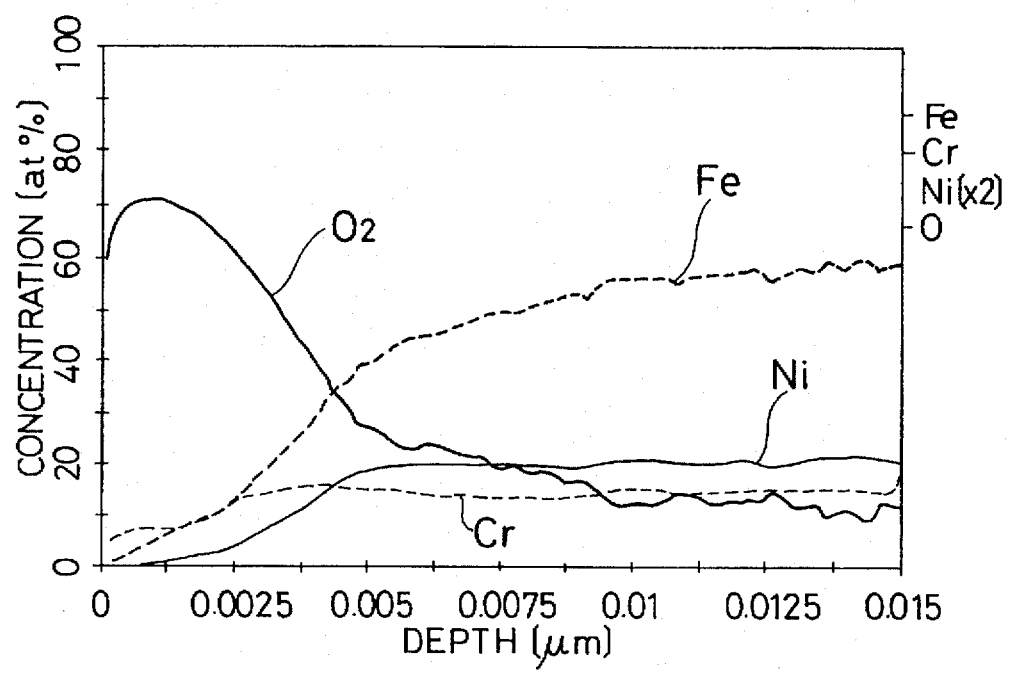
FIGS. 9(a) and 9(b) show the case of the treatment by the ozone gas of 100 VOL % of ozone, at 60° C. for 40 hours.
Figure 9B:
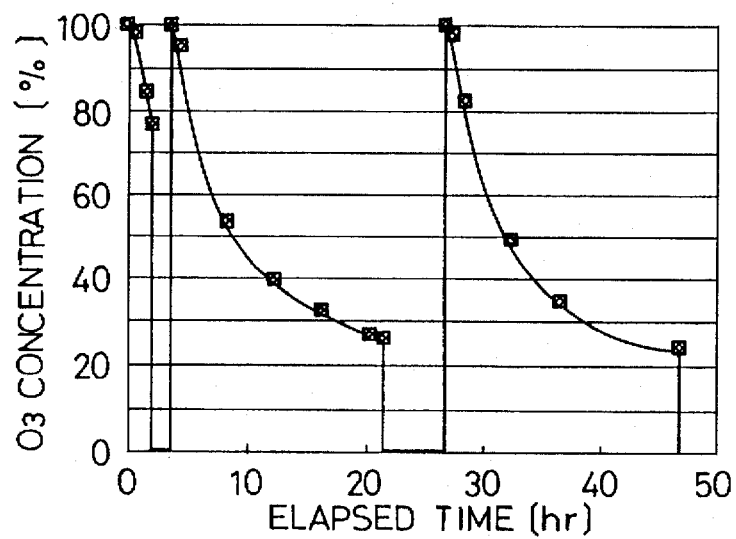

FIG. 9(a) shows the profiles in the case of the treatment at 60° C. for 40 hours, and FIG. 9(b) shows a change of the ozone concentration caused by the autolysis for that same treatment time, respectively. In this case it can be confirmed that an oxide film of about 45 to 55 Å has been formed.

Figure 10:
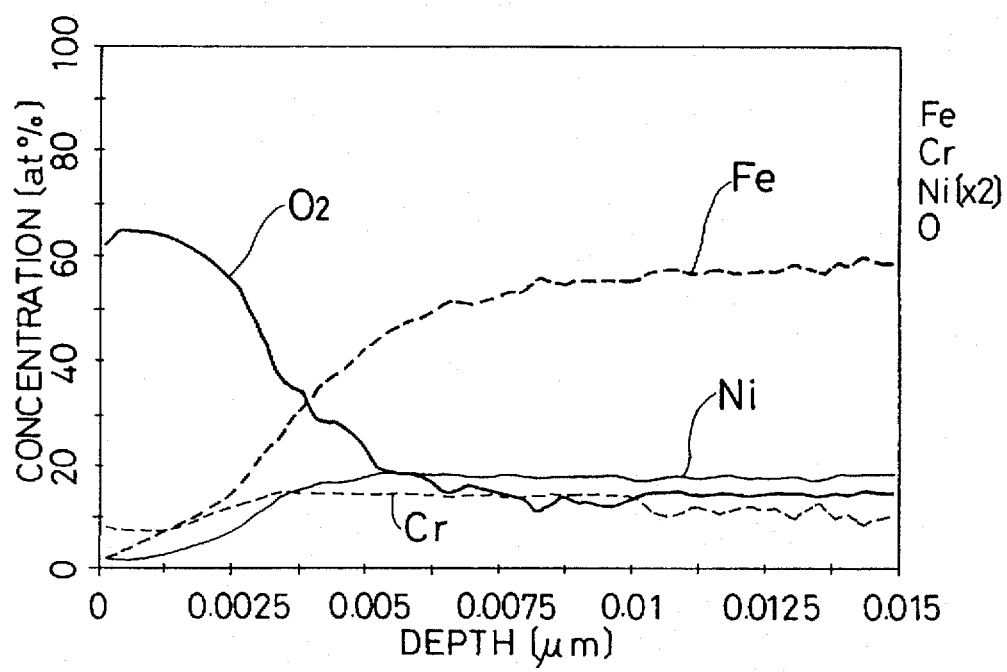
FIG. 10 shows the profiles of the element compositions thereof in the depth direction from the surface when treated by an ozone gas having a concentration of 50 VOL % of ozone in the ozone-oxygen system, at 20° C. for 40 hours.

When the electrolytically polished pipe is treated by the ozone gas having the concentration of 50 VOL % of ozone in the ozone-oxygen system at 20° C. for 40 hours, as shown in FIG. 10, it can be confirmed that an oxide film of about 40 Å has been formed.

Figure 11:
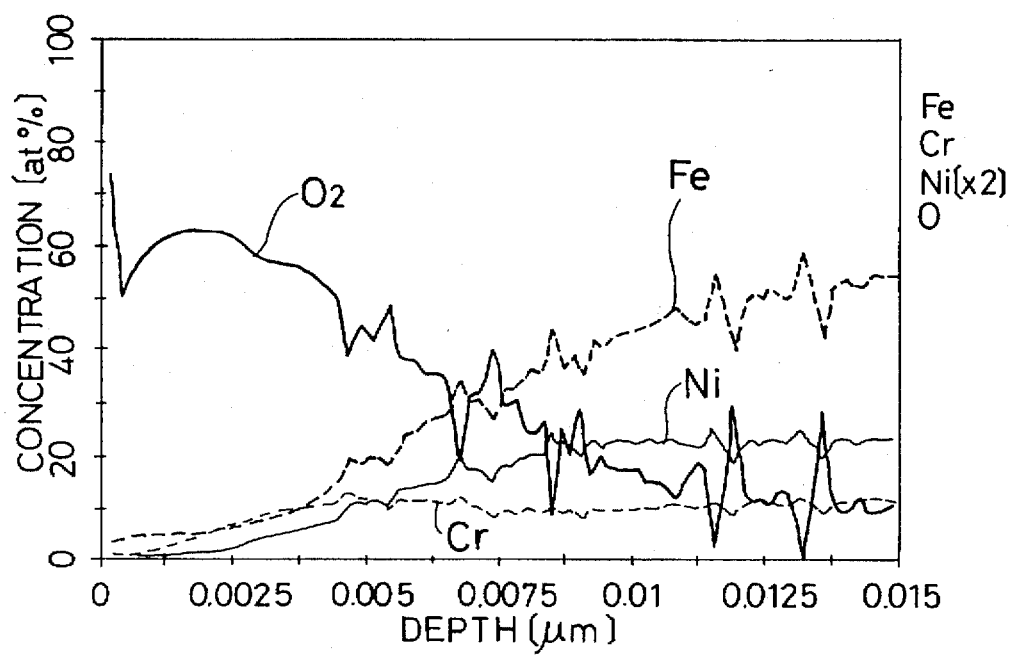
FIG. 11 shows the profiles of the element compositions thereof in the depth direction from the surface in the case where a welded portion was treated by employing the ozone gas having the concentration of 100 VOL % of ozone, at 40° C. for 40 hours.

The profiles of element compositions in the depth direction from the surface in the case where the welded portions have been treated by the ozone gas of 100 VOL % of ozone at 40° C. for 40 hours are shown in FIG. 11. It can be confirmed that an oxide film of about 60 to 80 Å has been formed.

As understood by those results, when the treatment temperature is increased from 20° C. to 40° C. in the case of the treatment time of 20 hours, the thickness of the oxide film becomes increased, but it is not increased so much even when the temperature is raised to 60° C. In the case of the treatment time of 40 hours, even when the treatment temperature is changed, the thickness of the oxide film doesn't differ, namely the oxide films are formed substantially equal in thickness. When the treatment temperature is raised, the autolysis reaction of the ozone becomes remarkably vigorous and the ozone concentration becomes decreased. Therefore, it can be understood that the increasing of the treatment temperature higher than 60° C. is not reflected in the increasing of the oxide film.

What is claimed is:

1. A process for passivating a piping system, which process comprises forming an oxide passivation film on a metal surface of the piping system by exposing an electrolytically polished or electrolytically combination-polished metal surface to a gas containing at least 50 VOL % ozone within the temperature range of room temperature to about 60° C.

2. The process according to claim 1, wherein the gas also comprises oxygen.

3. A process for passivating a piping system for a high-purity gas, which process comprises:

connecting a gas supply source and a gas utilizing apparatus to each other by a piping passage; and then passivating an interior gas contact surface of the piping passage by hermetically charging a gas having a concentration of at least 50 VOL % of ozone into the piping passage, wherein the passivating treatment is carried out within the temperature range of about room temperature to 60° C.

4. The process according to claim 3, wherein the gas also comprises oxygen.

* * * * *